Patented Feb. 7, 1950

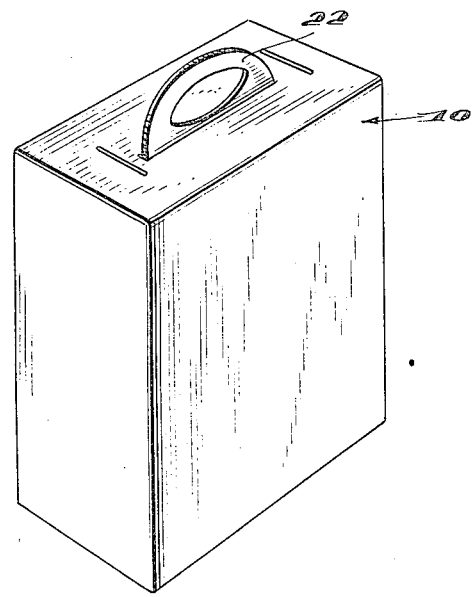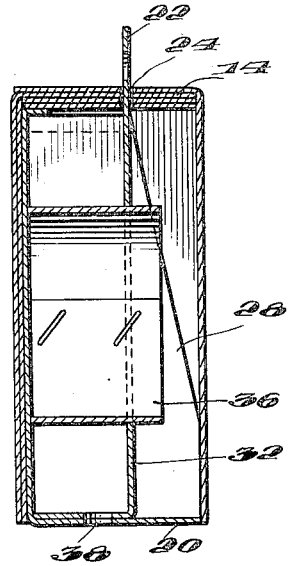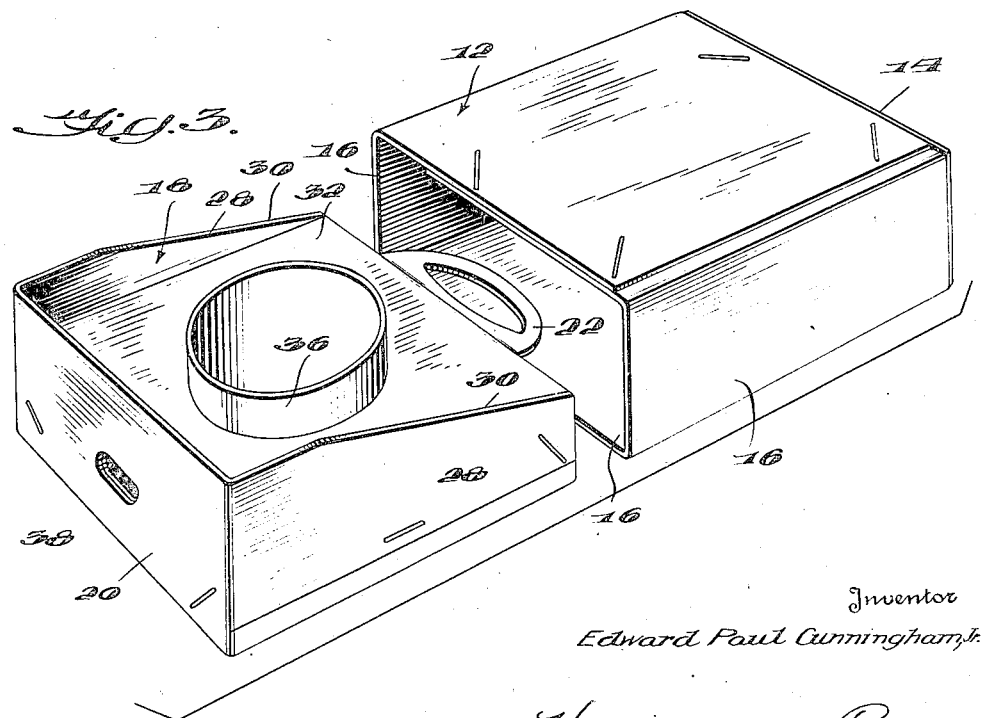

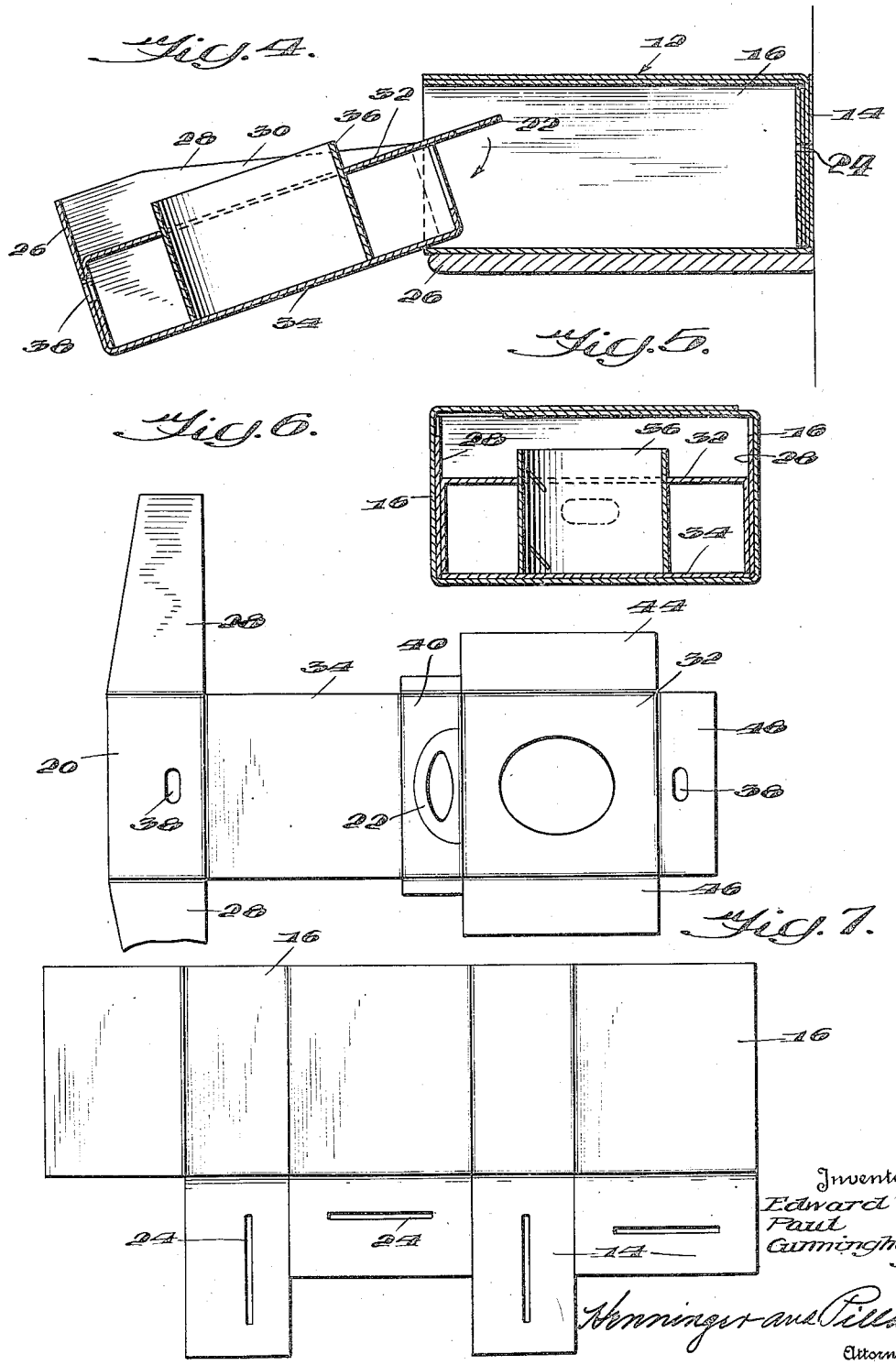

2,496,619

UNITED STATES PATENT OFFICE 2,496,619

MERCHANDISE CASE

Edward Paul Cunningham, Jr.,
New Rochelle, N. Y.

Application August 9, 1945, Serial No. 609,800

3 Claims. (Cl. 206—8)

1

This invention relates to portable merchandise cases and more particularly to such portable cases that are adapted for the subsequent storage of merchandise such as apparel or household appliances which is subject to intermittent use.

It is an object of the invention to provide a portable merchandise case having an outer casing with an end wall therein and a telescopically arranged merchandise-holding tray within the casing, the tray having an end wall substantially closing one end of the casing. In order to facilitate transportation of the case from one point to another as from a store to the purchaser's home, the invention seeks to provide a case wherein the tray has a handle formed in the inner end wall thereof which may be folded down into the plane of the wall and which may be raised into a plane at right angles thereto for projection through a slot in the end wall of the outer casing, thus providing a convenient handle for carrying the case from one point to another while at the same time avoiding special devices for holding the tray and its surrounding casing in assembled position.

A further object of the invention is to adapt the case to storage use and particularly temporary storage, i. e., the provision of a storage case which may be entered periodically as may be required for periodic access to articles contained therein. To this end the invention provides a merchandise-holding tray having side walls that slope to the rear of the tray, permitting the downward tilting of the tray when partially withdrawn from its surrounding casing.

These and other objects of the invention will become apparent as this specification proceeds with reference to the drawing which forms a part hereof and in which:

Figure 1 is a perspective view of the case;

Figure 2 is a longitudinal sectional view of the case;

Figure 3 is a perspective view of the case wherein the telescopic tray is removed from the outer casing;

Figure 4 is a transverse sectional view illustrating the outer casing in position of rest as on a shelf with the merchandise tray partially withdrawn therefrom;

Figure 5 is a sectional view substantially on the horizontal medial line of the case;

Figure 6 is a view of the blank forming the tray member; and

Figure 7 illustrates the blank forming the outer casing member.

Referring particularly to the drawing, it will be seen that the merchandise case 10 comprises

2 an outer casing 12 having an end wall 14 and side walls 16. A merchandise-holding tray 18 is adapted to be arranged telescopically within the outer casing 12 and this tray has an end wall 20 which is of such dimensions as to substantially contact the inner surfaces of the side walls 16 of the outer casing 12, thereby serving as a closure for one end of the outer casing 10 if that casing is provided without end wall flaps or other type of external closure or if the closure or flaps have been removed.

In order to adapt the case for ready transport from one point to another by an individual, the inner end wall of the tray 18 is provided with a handle loop 22 which herein is illustrated as being formed in the inner end wall of the tray. The handle 22 is so attached to the inner end wall of the tray that it may be folded into a plane parallel with the plane of the casing end wall 14. Herein the handle is disclosed as being formed in the end wall of the tray 18 and since the material used for its construction will usually be cardboard or heavy paper stock, the handle 22 may be folded along the line at which it is attached to the end wall, thereby permitting the same to be folded into the plane of the end wall. While a construction of cardboard has been mentioned, it is contemplated that any suitable material may be used. When a rigid construction material is used, the handle 22 will be provided with a suitable hinge.

The casing 10 is provided with a slot 24 in its end wall 14 and this slot may be defined by a perforated area that may be removed to form the slot or otherwise as may be desired. In any event, the handle 22 may be disposed at right angles to the end wall in which it is formed, and when so disposed, it may be projected through the slot 24 thereby providing a convenient handle for transporting the case. It will be apparent that when the handle is projected through the slot 24 and the case is being carried by its handle 22, the end wall 14 of the outer casing 10 will rest on the inner end wall of the tray 18 thereby holding the outer casing 12 and the telescopic tray 18 in assembled position without requiring closure devices of any other nature.

The case is adapted for the convenient storage of merchandise and to this end it may be disposed on one of its sides on a shelf support such as that shown at 26 in Figure 4. When the case is used for storage purpose, the handle 22 is folded down into the plane of the inner end wall of the tray or into a plane parallel thereto.

In order to permit the forward tilting of the tray without complete removal thereof from the casing 10, the tray is provided with a pair of side walls 28 which have rearwardly sloping upper edges 30, thus permitting the tray to tilt for ready access thereto without requiring that the tray be completely withdrawn from the casing.

It is obvious that the case may be particularly adapted for special types of merchandise such as wearing apparel or household appliances and herein the illustrative embodiment shows a special adaptation of the case to use as a hat box. In order to adapt the tray to this specific use, the tray is provided with a platform 32 which is spaced from the bottom wall 34 of the tray. The platform 32 is centrally recessed to receive a hat crown well 36 which is designed to more or less snugly embrace the crown of a hat disposed therein.

To facilitate manipulation of the tray with respect to the casing 12, the front wall 20 of the tray is provided with a suitable hand hold 38 at which point the tray may be grasped for insertion into and removal from the casing 12.

It is obvious that the particular mode of manufacturing the case is unimportant. However, in order that the invention may be understood in all of its details, a suitable blank for the manufacture of the respective elements of the case is illustrated in Figures 6 and 7. Figure 6 shows a blank from which the tray may be constructed while Figure 7 shows a blank suitable for the formation of the casing 12.

One way of fabricating the tray and the casing of single flat sheets of stock such as corrugated or paper board, plastic or metal sheet has been herein illustrated. In Figure 7 the tray blank is illustrated as consisting of a bottom wall panel 34, side wall panels 28, outer end wall panel 20, inner end wall panel 40, platform 32, platform side panels 44, 46, and 48. In the formation of the tray, the inner end wall panel 40 is disposed in a position perpendicular to the bottom panel 34, the platform panel 32 is turned into overlying parallel relation with the bottom panel 34, the platform side wings 44, 46, and 48 are turned downwardly whereafter the outer wall panel 20 is turned upwardly, perpendicularly to the bottom wall 34 and the side wall panels 28 are turned inwardly embracing the panels 44 and 46 whereafter the structure may be suitably fixed in erected position by any convenient means.

The casing blank consists of side wall panels 16 and end wall panels 14 which are adapted to overlie each other with slots 24 in registration, forming the closed end wall of the casing. When the side wall panels 16 are bent at right angles to each other, they will form a closed rectangle as shown in Figure 2 and in this position the respective panels may be secured in any known manner to fix the parts in erected position.

The principle of the invention may be applied in various ways and it is therefore intended that the practice of the invention be not limited to any particular embodiment and that the scope thereof shall be defined only by the terms of the following claims.

I claim:

1. A portable merchandise case comprising an outer casing having an end wall therein, a merchandise tray telescopically arranged within said casing, said tray having an outer end wall therein substantially in contact with the surrounding walls within said casing, an inner end wall in said tray, a handle carried by said inner end wall adapted to extend through a slot in the end wall of said casing, a pair of tray side walls having upper edges that slope downwardly toward the inner end of said tray permitting tilting of said tray while partially engaged in said casing, and a finger hold in the outer end wall of said tray to facilitate removal of said tray from said casing.

2. A portable merchandise case comprising an outer casing having an end wall therein, a slot in said end wall, a merchandise tray telescopically arranged within said casing, said tray having an outer end wall therein substantially in contact with the surrounding walls within said casing, an inner end wall in said tray, a handle formed in said inner end wall adapted to extend through said slot, a pair of tray side walls having upper edges that slope downwardly toward the inner end of said tray permitting tilting of said tray while partially engaged in said casing, and a finger hold in the outer end wall of said tray to facilitate removal of said tray from said casing.

3. A portable hat box comprising an outer casing having an end wall therein, a slot in said end wall, a hat-supporting tray telescopically arranged within said casing, a hat-supporting well carried by said tray, said tray having an outer end wall therein substantially in contact with the surrounding walls within said casing, an inner end wall in said tray, a handle formed in said inner end wall adapted to extend through said slot, said handle being adapted to be folded into the plane of said inner end wall when not in use, a pair of tray side walls having upper edges that slope downwardly toward the inner end of said tray permitting tilting of said tray while partially engaged in said casing, and a finger hold in the outer end wall of said tray to facilitate removal of said tray from said casing.

EDWARD PAUL CUNNINGHAM, Jr.

REFERENCES CITED

The following references are of record in the file of this patent:

UNITED STATES PATENTS

| Number | Name | Date |
|---|---|---|
| 1,076,076 | Story | Oct. 21, 1913 |
| 1,639,166 | Burton | Aug. 16, 1927 |
| 1,771,706 | Cavanagh | July 29, 1930 |
| 2,085,104 | Levinson | June 29, 1937 |

FOREIGN PATENTS

| Number | Country | Date |
|---|---|---|
| 304,553 | Great Britain | Jan. 24, 1929 |